United States Patent
Pos et al.

(10) Patent No.: US 9,660,689 B2
(45) Date of Patent: May 23, 2017

(54) MULTIPLE RADIO FREQUENCY (RF) SYSTEMS USING A COMMON RADIO FREQUENCY PORT WITHOUT AN RF SWITCH

(71) Applicant: Honeywell International Inc., Morristown, NJ (US)

(72) Inventors: Marc M. Pos, Duvall, WA (US); Keone J. Holt, Duvall, WA (US)

(73) Assignee: Honeywell International Inc., Morris Plains, NJ (US)

( * ) Notice: Subject to any disclaimer, the term of this patent is extended or adjusted under 35 U.S.C. 154(b) by 111 days.

(21) Appl. No.: 14/540,903

(22) Filed: Nov. 13, 2014

(65) Prior Publication Data

US 2016/0142095 A1  May 19, 2016

(51) Int. Cl.
| | |
|---|---|
| H04B 1/44 | (2006.01) |
| G01S 7/03 | (2006.01) |
| G01S 7/40 | (2006.01) |
| G01S 13/87 | (2006.01) |
| H01Q 23/00 | (2006.01) |
| H04W 72/04 | (2009.01) |
| H01Q 21/30 | (2006.01) |
| G01S 13/95 | (2006.01) |

(52) U.S. Cl.
CPC ............... *H04B 1/44* (2013.01); *G01S 7/03* (2013.01); *G01S 7/4008* (2013.01); *G01S 13/87* (2013.01); *H01Q 21/30* (2013.01); *H01Q 23/00* (2013.01); *H04W 72/0453* (2013.01); *G01S 13/953* (2013.01)

(58) Field of Classification Search
None
See application file for complete search history.

(56) References Cited

U.S. PATENT DOCUMENTS

| | | | |
|---|---|---|---|
| 4,356,492 A | 10/1982 | Kaloi | |
| 4,912,436 A | 3/1990 | Alford et al. | |
| 4,970,479 A | * 11/1990 | Landt | H01P 1/2053 |
| | | | 333/101 |

(Continued)

FOREIGN PATENT DOCUMENTS

| | | |
|---|---|---|
| EP | 0744628 A2 | 11/1996 |
| FR | 2621133 A1 | 3/1989 |
| JP | 06224629 A | 8/1994 |

OTHER PUBLICATIONS

Extended Search Report from counterpart European Application No. 15193757.0, dated Apr. 11, 2016, 9 pp.

(Continued)

*Primary Examiner* — Alejandro Rivero
(74) *Attorney, Agent, or Firm* — Shumaker & Sieffert, P.A.

(57) ABSTRACT

Methods and systems are disclosed for changing between multiple radio frequency (RF) systems. The method comprising transmitting, by a first radio frequency (RF) transmitter of a first RF system, a first RF signal from an antenna, receiving, by a first RF receiver of the first RF system, a second RF signal from the antenna, and receiving, by a second RF receiver of a second RF system, the second RF signal from the antenna, wherein a first RF port of the first RF system and a second RF port of the second RF system are both connected to a common RF port of the antenna, and wherein the first and second RF systems operate with overlapping frequency bands.

20 Claims, 6 Drawing Sheets

(56) References Cited

U.S. PATENT DOCUMENTS

| | | |
|---|---|---|
| 5,351,272 A | 9/1994 | Abraham |
| 5,633,615 A | 5/1997 | Quan |
| 5,801,599 A | 9/1998 | Flynn et al. |
| 6,018,644 A * | 1/2000 | Minarik ............... H01Q 3/267 455/561 |
| 6,046,702 A | 4/2000 | Curtis et al. |
| 6,624,786 B2 | 9/2003 | Boyle |
| 7,215,284 B2 | 5/2007 | Collinson |
| 8,022,861 B2 | 9/2011 | Margomenos |
| 8,078,119 B2 | 12/2011 | Gorbachov |
| 8,606,198 B1 | 12/2013 | Wright |
| 8,768,267 B2 | 7/2014 | Lee et al. |
| 2005/0219010 A1* | 10/2005 | Erb ................. H04B 1/0458 333/126 |
| 2009/0298451 A1 | 12/2009 | Malaga et al. |
| 2010/0171647 A1* | 7/2010 | Naravanamurthy .. G01S 13/767 342/37 |
| 2011/0175789 A1 | 7/2011 | Lee et al. |
| 2011/0234469 A1* | 9/2011 | Shoji ................. H01Q 21/28 343/852 |
| 2013/0122824 A1 | 5/2013 | Schell |
| 2013/0162486 A1* | 6/2013 | Korva ................. H01Q 1/243 343/725 |

OTHER PUBLICATIONS

Response to Extended Search Report dated Apr. 11, 2016, from counterpart European Application No. 15193757.0, filed Nov. 10, 2016, 20 pp.

* cited by examiner

MULTIPLE RADIO FREQUENCY (RF) SYSTEMS USING A COMMON RADIO FREQUENCY PORT WITHOUT AN RF SWITCH

TECHNICAL FIELD

This disclosure relates to radio-frequency (RF) systems.

BACKGROUND

Aircraft typically have radio frequency (RF) systems, such as weather radar, communication, and navigation systems onboard to detect adverse weather conditions. Detecting adverse weather conditions enables the flight crew to make changes to the flight plan in order to avoid potentially hazardous weather. Weather radar is used, for example, to locate precipitation, calculate the motion of precipitation, and determine the type of precipitation. Additionally, some weather radars are capable of detecting the motion of rain droplets and the intensity of the precipitation, which can be analyzed to determine the structure of storms. Up-to-date weather information assists the flight crew in evaluating whether or how to modify a flight plan to ensure safely of the flight.

SUMMARY

In general, various examples of this disclosure are directed to methods, systems, and devices for changing between multiple radio frequency (RF) systems at a common RF port of an antenna without a physical RF switch. The switchless RF port of this disclosure may, for example, be implemented into various aircraft systems, such as onboard weather radar systems and RF communication systems, as well as into other non-aircraft applications.

In one example, a method for changing between multiple radio frequency (RF) systems, the method comprising transmitting, by a first radio frequency (RF) transmitter of a first RF system, a first RF signal from an antenna, receiving, by a first RF receiver of the first RF system, a second RF signal from the antenna, and receiving, by a second RF receiver of a second RF system, the second RF signal from the antenna, wherein a first RF port of the first RF system and a second RF port of the second RF system are both connected to a common RF port of the antenna, and wherein the first and second RF systems operate with overlapping frequency bands.

Another example is directed to a system comprising a plurality of RF systems. Each of the plurality of RF systems comprises a transmitter, a receiver, and an RF port. The system further comprising an antenna comprising a common RF port, a plurality of RF links, wherein each RF link of the plurality of RF links couples the respective RF system of the plurality of RF systems to the common RF port, and an RF processing unit, wherein a first RF system of the plurality of RF systems is configured to transmit a first RF signal from the antenna by a first transmitter via the first RF link, and wherein the plurality of RF systems are configured to receive a second RF signal from the antenna via the plurality of RF links, and wherein the plurality of RF systems operate with overlapping frequency bands.

Another example is directed to a computer-readable storage medium comprising instructions that, when executed by at least one processor, cause the at least one processor to receive a control input, wherein the control input is indicative of a selection of a first RF system of a plurality of RF systems to transmit a first RF signal from an antenna by a first RF transmitter, generate, in response to receiving the control input, a deactivation signal to a first termination unit coupled between the first RF system and the antenna, wherein the deactivation signal to the first termination unit of the first RF system enables the first RF system to conduct transmission RF energy to the antenna, and generate, in response to receiving the control input, an activation signal to any other termination units except for the first termination unit, wherein the other termination units isolate the first RF system by conducting RF energy between the plurality of RF systems and the antenna to ground, except for the RF energy between the first RF system and the antenna.

The details of one or more examples are set forth in the accompanying drawings and the description below. Other features, objects, and advantages will be apparent from the description and drawings, and from the claims.

DETAILED DESCRIPTION

Radio frequency (RF) systems, such as those utilized in aircraft, may have the need to select between one or more transmitters and/or receivers to enhance transmissions and reception sensitivity, and in some examples allow for redundant systems. Conventional RF systems often select between multiple RF systems using an RF switch, such as a mechanical relay, waveguide switch, or solid state switch. The operational lifetime of the RF switch is limited by the wear and tear on the physical switching mechanism, with the typical switch life being around one million to five million switch cycles. In addition to the limited operational lifetime of the RF switch, RF switches also require active circuitry and the physical switching mechanism. The various types of RF switches also have other potential shortcomings. For example, a waveguide switch is expensive due to the need for complex and precise switching mechanisms, and a solid state switch is limited by the amount of power that the P-Intrinsic-N (PIN) diodes are able to handle while switching.

This disclosure provides various examples generally directed to methods, systems, and devices for changing between multiple RF systems at a common RF port of an antenna without a physical RF switch. For example, when implementing the techniques of this disclosure, multiple weather radar systems may provide redundant weather information to assist pilots in flight without the use of a physical switch for switching between multiple RF ports. In another example, multiple onboard RF communication systems may provide redundant communication information to assist pilots in flight without the use of a physical switch for switching between multiple RF ports. In other examples one transmitter may be selected and multiple RF receivers used simultaneously (e.g., diversity reception) in a diversity receiver system.

Changing between multiple RF transmit and receive systems at a common RF port of an antenna without an RF switch may increase the operational lifetime and reliability of the overall system. Additionally, the lack of a physical RF switch may also decrease the form factor of the overall system, and using one transmitter and multiple receivers may improve the sensitivity of the overall system. As used in this disclosure, the term physical switch generally refers to a switch with moving parts, and the term switchless generally refers to the lack of a physical switch. In other words, the term switchless is generally used to refer to the lack of a switch with moving parts. The methods, systems, and devices described in this disclosure as switchless may still include switching functionality but implement such functionality without physical switches with moving parts.

Figure 1:
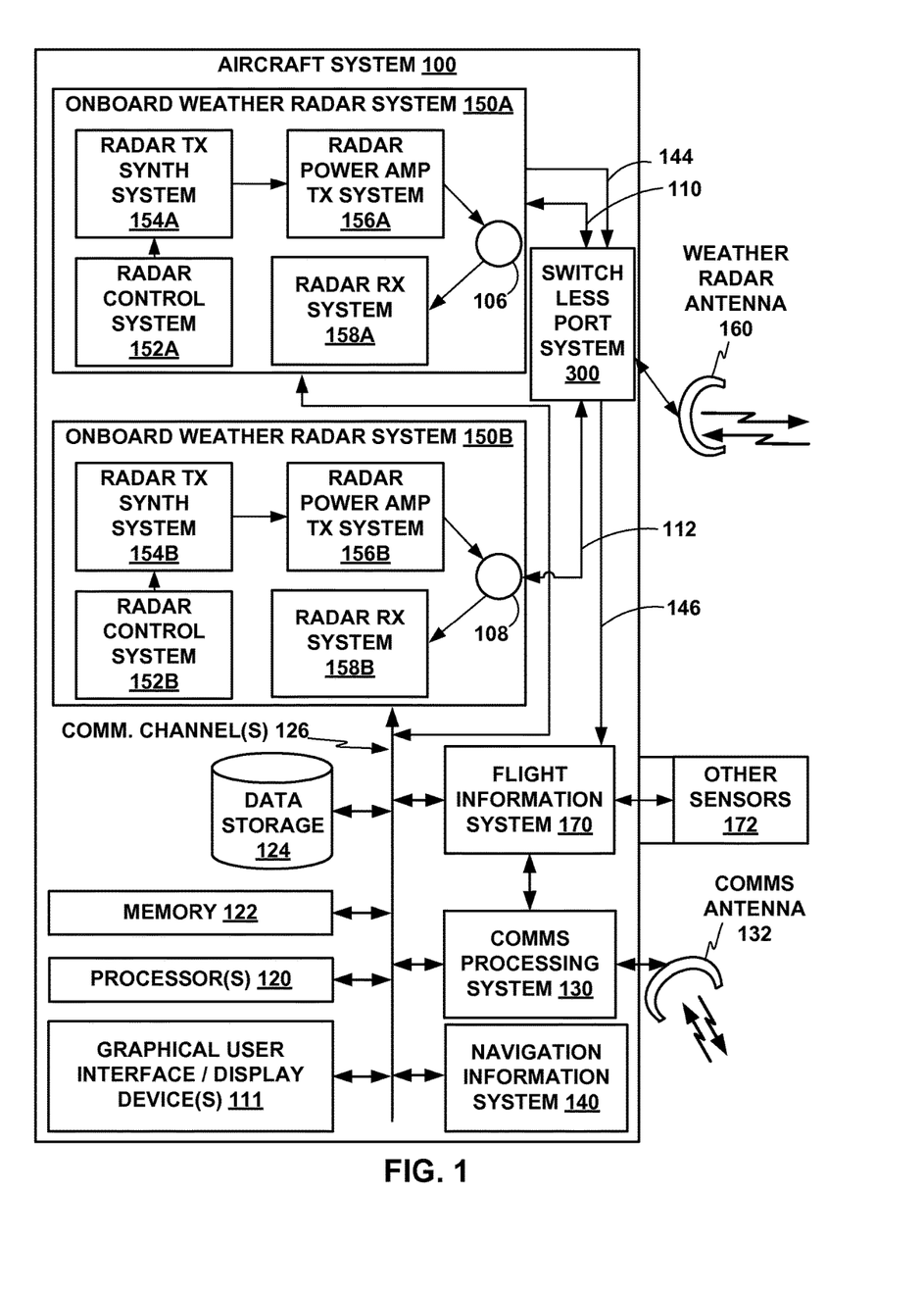
FIG. 1 is a functional block diagram illustrating an example aircraft system that operates two RF transmit and receive systems connected to a common radio frequency (RF) port of an antenna without a physical RF switch.

FIG. 1 is a functional block diagram illustrating an example aircraft system 100 that operates two RF transmit and/or receive (tx/rx) systems (i.e. systems 150A and 150B collectively "onboard weather radar systems 150" in FIG. 1) connected to a common RF port of an antenna without a physical RF switch. Aircraft system 100 may, for example, be a system onboard an aircraft providing the flight crew with comprehensive information needed for a safe flight and may include any number of systems, such as radar and communications systems. Although the example of FIG. 1 shows the two RF tx/rx systems as being onboard weather radar systems, other types of RF systems such as, but not limited to, RF communication systems may also be used in accordance with the techniques of this disclosure. For example, the wireless data radios used in the "backhaul" for cellular systems may also be configured to operate in accordance with the techniques of this disclosure.

In the example of FIG. 1, aircraft system 100 includes RF ports 106 and 108, RF links 110 and 112, and graphical user interface/display device 111 ("display device 111"). In the example of FIG. 1, aircraft system 100 includes one or more processor(s) 120, memory 122, and data storage 124, which are shown separately from display device 111 in FIG. 1, but which may be incorporated as part of display device 111 or may be incorporated into other systems as described herein. In the example of FIG. 1, aircraft system 100 also includes communications processing system 130, communications antenna 132, navigation information system 140, onboard weather radar systems 150A and 150B, weather radar antenna 160, flight information system 170, other sensors 172, switchless port system 300 (also referred to in this disclosure as "system 300"), and onboard communication channels 126 enabling communicative connections among the various onboard systems.

RF ports 106 and 108 are individual RF ports to onboard weather radar systems 150A and 150B, which transition the radar signal from onboard weather radar systems 150A and 150B to RF links 110 and 112, respectively. RF links 110 and 112 are any form of RF transmission, such as, but not limited to, a waveguide, a coaxial cable, or a fiber optic cable. Display device 111 may generate and display graphical displays of maps of flight paths of an aircraft, along with meteorological conditions in the range of a flight path. In other examples, display device 111 may be provided by a primary flight display (PFD), a multifunction display (MFD), a navigation display, or any other suitable display.

Processor(s) 120 as well as other processors disclosed herein, can each comprise any suitable arrangement of hardware, software, firmware, or any combination thereof, to perform the techniques attributed to the respective processor 120 herein. For example, processor(s) 120 may each include any one or more microprocessors, digital signal processors (DSPs), application specific integrated circuits (ASICs), field programmable gate arrays (FPGAs), or any other equivalent integrated or discrete logic circuitry, as well as any combinations of such components. Data storage 124 may include one or more hard disk drives, one or more flash drives, and/o one or more additional non-volatile or more or less long-term data storage devices. Memory 122 may include random access memory (RAM) integrated circuits, cache circuits, and/or one or more volatile or more or less short-term data storage devices. Data storage 124 and/or memory 122 may also include one or more devices or systems that may function or be used as either long-term data storage and/or short-term memory.

Communications processing system 130 may be any RF communication system that enables an aircraft to communicate with another entity (e.g., other aircraft, air traffic controller, and/or one or more satellites). Communications antenna 132 may be any form of antenna capable of transmitting and receiving an RF signal to and from another source, for example but limited to, a directional antenna or an omni-directional antenna. Navigation information system 140 may include, e.g., an Inertial Navigation System (INS), a Global Positioning System (GPS), or any combination thereof.

Onboard weather radar systems 150 include RF port 106 and 108, radar control system 152A and 152B, radar transmitter synthesizer system 154A and 154B, radar power amplification transmitter system 156A and 156B, and radar receiver system 158A and 158B, respectively. Onboard weather radar systems 150 may operate with overlapping frequency bands, such that onboard weather systems 150 may utilize diversity reception. Diversity reception, in some examples, may be when both of onboard weather radar systems 150 receive the weather radar reflections simultaneously, which may increase the sensitivity of the overall system. Weather radar operates at X-band, i.e., 8-12.5 GHz, and more specifically approximately 9-9.5 GHz. In another example, maritime radar operates at S-band, i.e., 2-4 GHz. Onboard weather radar systems 150 via RF ports 106 and 108, RF links 110 and 112, and switchless port system 300, may gather weather radar data for detecting, characterizing, and imaging weather systems, including significant weather conditions that may be hazardous to a flight from weather radar antenna 160. Weather radar antenna 160 may be any form of antenna with at least one RF port capable of transmitting a radar signal to weather systems and receiving reflections from the weather systems (e.g., a directional pencil beam antenna). In some examples, onboard weather radar system 150A outputs control input signal 144 to switchless port system 300. Control input signal 144 may be any form of input signal (e.g., optical or electrical) and controls the selection of a specific RF system of onboard weather radar systems 150.

Flight information system 170 may include the one or more processors onboard an aircraft, and may include, e.g., a flight management system (FMS), an air data computer (ADC), or any combination thereof. Other sensors 172 may include any other sensors that may provide additional detail to flight system 170 (e.g., a LIDAR system). Switchless port system 300 may include a common RF port (e.g., an RF port connected to two RF tx/rx systems without a physical switch) of weather radar antenna 160, RF loads, RF detection units, and an RF processing unit, as described below in FIG. 3. In some examples, switchless port system 300 outputs status output 146 to flight information system 170. Status output 146 may be any form of output signal (e.g., optical or electrical) and is indicative of the status (e.g., activation or deactivation) of switchless port system 300 with respect to onboard weather radar systems 150.

In some examples, one or more processors of aircraft system 100 onboard an aircraft may determine whether to send control input signal 144 to switchless port system 300 to change between the onboard weather radar systems 150 depending on the desired onboard weather radar system. In other examples, one or more processors of flight information system 170 onboard an aircraft may receive status output 146, which may provide information to flight information system 170 that switchless port system 300 is using a particular weather radar system of onboard weather radar systems 150.

In some examples, switchless port system 300 does not control which of onboard weather radar systems 150 is selected, but rather switchless port system 300 may be controlled by a radar control system (e.g., radar control system 152A or radar control system 152B). In some examples, onboard weather radar system 150A may be the master system and control switchless port system 300 with control input signal 144. In this example, flight information system 170 may receive status output 146 from switchless port system 300, which may indicate the status of onboard weather radar systems 150. Conversely, in other examples, onboard weather radar system 150B may be the master system and control switchless port system 300 with a control input signal (e.g., similar to control input signal 144).

In some examples, switchless port system 300 may, based on control input signal 144, change between RF tx/rx systems by activating onboard weather radar system 150A and deactivating onboard weather radar system 150B, to enable the energy from onboard weather radar system 150A to be conducted to weather radar antenna 160. In other examples, switchless port system 300 may, based on control input signal 144, change between RF tx/rx systems by activating onboard weather radar system 150B and deactivating onboard weather radar system 150A, to enable the energy from onboard weather radar system 150B to be conducted to weather radar antenna 160.

Figure 2:
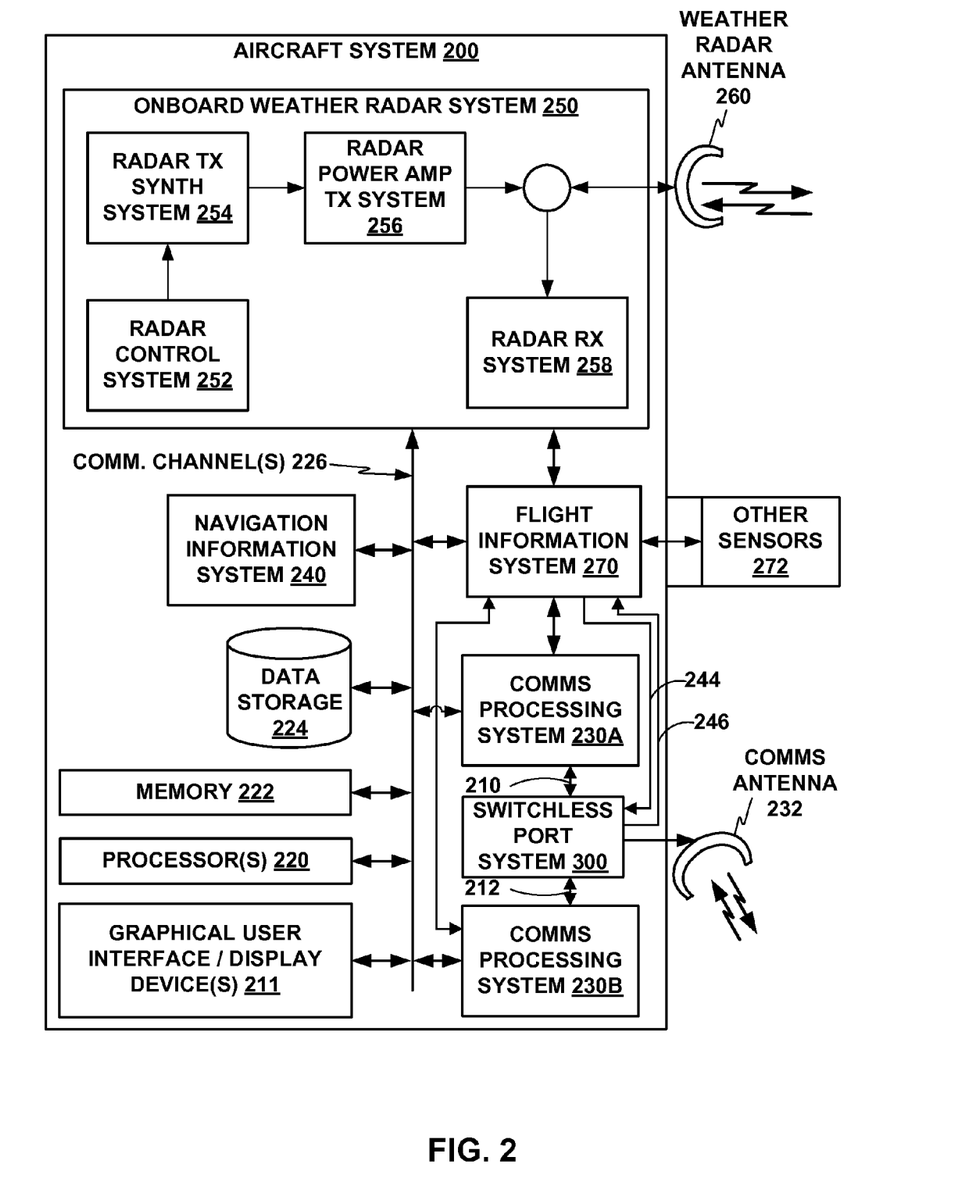
FIG. 2 is a functional block diagram illustrating an example aircraft system that operates two RF transmit and receive systems connected to a common RF port of an antenna without a physical RF switch.

FIG. 2 is a functional block diagram illustrating another example aircraft system 200 that operates two RF tx/rx systems (e.g., systems 230A and 230B in FIG. 2) connected to a common RF port of an antenna without a physical RF switch. Although the example of FIG. 2 shows the two RF tx/rx systems as being communication processing systems, other types of RF systems such as radar systems may also be used in accordance with the techniques of this disclosure.

In the example of FIG. 2, aircraft system 200 includes RF links 210 and 212, display device 211, one or more processor(s) 220, memory 222, data storage 224, communications processing systems 230A and 230B, communications antenna 232, navigation information system 240, onboard weather radar system 250, weather radar antenna 260, flight information system 270, other sensors 272, switchless port system 300, and onboard communication channels 226 enabling communicative connections among the various onboard systems. The systems and components of aircraft system 200 may correspond to RF links 110 and 112, display device 111, one or more processor(s) 120, memory 122, data storage 124, communications processing system 130, communications antenna 132, navigation information system 140, onboard weather radar systems 150, weather radar antenna 160, flight information 170, other sensors 172, switchless port system 300, and onboard communication channels 126, respectively as described in FIG. 1.

Communications processing systems 230A and 230B (collectively "communication processing systems 230") may be any RF communication system that enables an aircraft to communicate with another entity (e.g., other aircraft, air traffic controller, and/or one or more satellites). In some examples, communication processing systems 230 may operate with overlapping frequency bands. Communications antenna 232 may be any form of antenna capable of transmitting and receiving an RF signal to and from another source, for example but limited to, a directional antenna or an omni-directional antenna.

Flight information system 270 may include the features indicated above with reference to FIG. 1, including the one or more processors onboard an aircraft Onboard weather radar system 250 includes radar control system 252, radar transmitter synthesizer system 254, radar power amplification transmitter system 256, and radar receiver system 258. Onboard weather radar system 250 and weather radar antenna 260 may gather weather radar data for detecting, characterizing, and imaging weather systems, including significant weather conditions that may be hazardous to flight. Aircraft system 200 may transmit this weather radar data as part of initial data sets via communications antenna 232 via a standard channel to hub system 110. Aircraft system 200 may also transmit range and angle settings from onboard weather radar system 250, and data on the position, flight path, heading, and altitude of the aircraft from, e.g., navigation information system 240 and flight information system 270, and data from other sensors 272, to hub system 110 as part of the initial data sets.

The flight information system 270 onboard an aircraft may include, e.g., a flight management system (FMS), an air data computer (ADC), or any combination thereof. One or more processors of the flight information system onboard an aircraft may determine whether to send a request to hub system 110 for more detailed information about a significant weather condition based on the nominal flight path indicated by the FMS or the ADC or one or more processors of the flight information system onboard an aircraft may provide information to the flight crew to assist them in evaluating whether to issue a request for more detailed information about a significant weather condition.

In some examples, one or more processors of flight information system 270 onboard an aircraft may determine whether to send control input signal 244 to switchless port system 300. Control input signal 244 may be any form of input signal (e.g., optical or electrical) and controls the change between communications processing systems 230 depending on the desired communication processing system.

In other examples, one or more processors of flight information system 270 onboard an aircraft may receive status output 246 from switchless port system 300. Status signal 246 may be any form of output signal (e.g., optical or electrical) and is indicative of the status of switchless port system 300 with respective communication processing systems 230. In some examples, switchless port system 300 does not control which of communication processing systems 230 is selected, but rather switchless port system 300 may be controlled by flight information system 270.

In some examples, switchless port system 300 based on control input signal 244 may change between RF tx/rx systems by activating communication processing system 230A and deactivating communication processing system 230B, to enable the energy from communication processing system 230A to be conducted to communications antenna 232. In other examples, switchless port system 300 based on control input signal 244 may change between RF tx/rx systems by activating communication processing system 230B and deactivating communication processing system 230A, to enable the energy from communication processing system 230B to be conducted to communications antenna 232.

Figure 3:
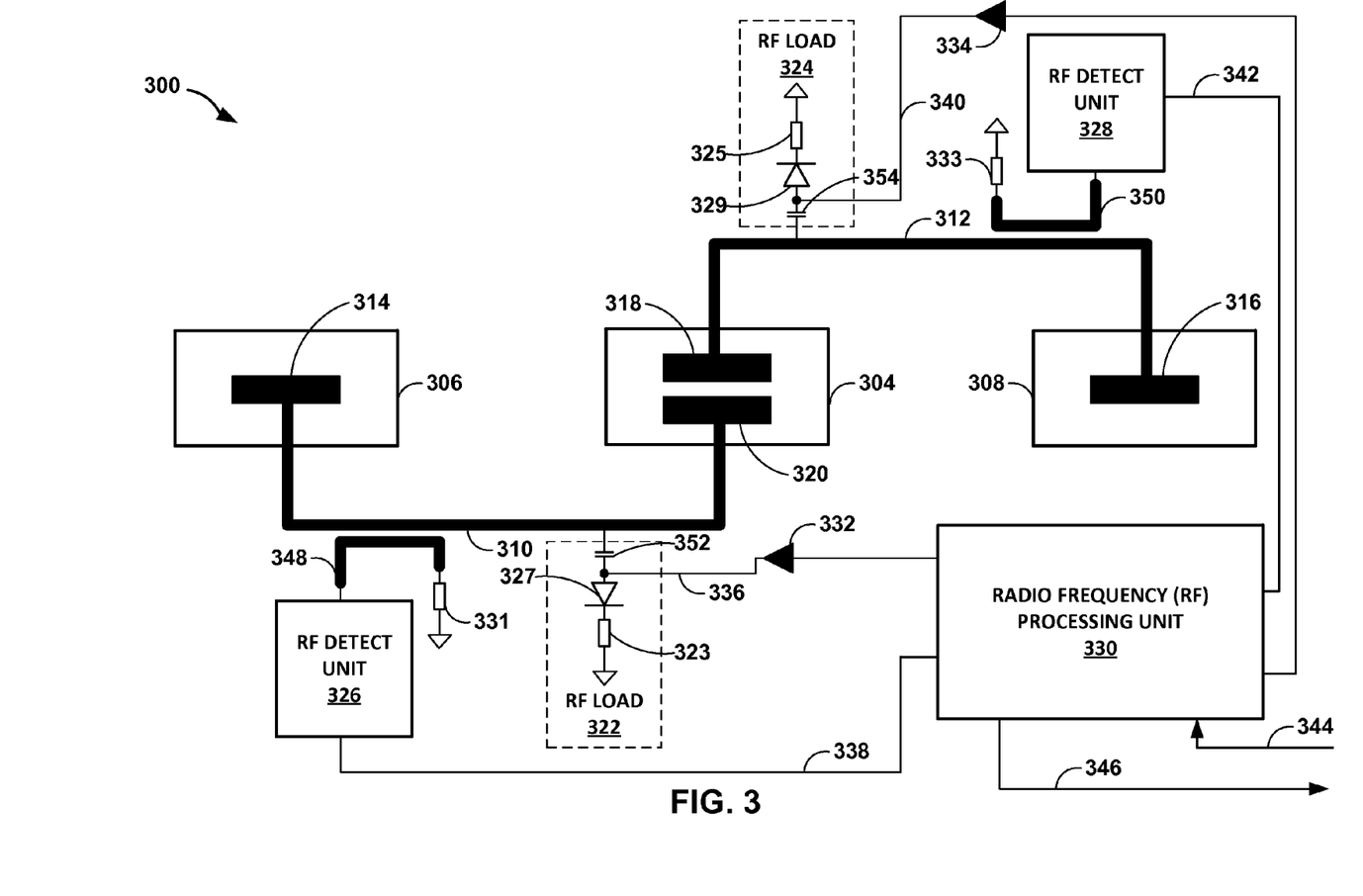
FIG. 3 is a conceptual diagram illustrating a system that enables two different RF transmit and receive systems to be connected at a common RF port of an antenna without a physical RF switch.

FIG. 3 is a conceptual diagram illustrating a system 300 that enables two different RF tx/rx systems to be connected at a common RF port of an antenna without a physical RF switch. In the example of FIG. 3, switchless port system 300 includes common RF port 304, RF system ports 306 and 308, RF links 310 and 312, microstrip to waveguide transitions 314-320, RF loads 322 and 324, RF detect unit 326 and 328, RF processing unit 330, diodes 332 and 334, links 336-342, RF detect link 348 and 350, and capacitors 352 and 354.

Common RF port 304 may be an RF socket of any RF medium that allows the transmission and reception of RF signals such as, but not limited to, an antenna, a waveguide, a coaxial cable, and the like. In some examples, common RF port 304 may be a coaxial RF connector on a coaxial cable. In some examples, the "common" aspect of common RF port 304 may be the exclusion of a physical switch between the two RF tx/rx systems and common RF port 304. In other words, two RF tx/rx systems connected at an RF port, without a physical switch in between, qualifies the RF port as a "common" RF port. In this manner, RF system port 306 and 308 are not a "common" port because only a single RF tx/rx system is connected at RF system port 306 and 308. However, if another RF tx/rx system is connected to RF system port 306 or 308 without a physical switch in between (e.g., daisy chaining multiple switchless systems), then RF system port 306 or 308 may qualify as a "common" port. RF system port 306 and 308 may be an RF socket of an RF system that allows the transmission and reception of RF signals to other components in system 300. RF system port 306 and 308 include microstrip to waveguide transitions 314 and 316, respectively. In some examples, RF system port 306 and 308 may be an aperture or opening at the end of a waveguide. In some examples, RF system port 306 and 308 may be described herein as an "RF port."

RF links 310 and 312 may be any medium capable of conducting RF energy from one location to another. Examples of RF links 310 and 312 include, but are not limited to, physical and/or wireless electrical transmission mediums such as waveguides, coaxial cables, and the like. Microstrip to waveguide transitions 314, 316, 318, and 320 (collectively "microstrips 314-320") may be electrical transmission lines that provide RF transitions between RF ports 304, 306, and 308 and RF links 310 and 312. In some examples, common RF port 304 may include microstrip to waveguide transitions 318 and 320. In some examples, microstrips 314-320 may include a conducting strip separated from a ground plane by a dielectric substrate. In some examples, microstrips 314 and 316 may enable the RF signals in RF system port 306 and 308 to be transitioned into RF signals in RF links 310 and 312. In these examples, microstrips 314 and 316 may enable the RF signals in RF links 310 and 312 to be transitioned into RF signal in RF system port 306 and 308. In these examples, microstrips 314 and 316 may also enable the RF signals in RF links 310 and 312 to be transitioned into RF signals at an onboard weather radar system, such as onboard weather radar system 150A and 150B, as described in FIG. 1 connected at RF systems ports 306 and 308. In some examples, microstrips 318 and 320 may enable the RF signals in the antenna to be transitioned into RF signals on RF links 310 and 312. In these examples, microstrips 318 and 320 may enable the RF signals in RF links 310 and 312 to be transitioned into RF signals in the antenna.

RF loads 322 and 324 may include diodes 327 and 329 that can be activated to couple RF links 310 and 312 and capacitors 352 and 354 to resistors 323 and 325, which are coupled to ground. In some examples, capacitors 352 and 354 may be DC blocking capacitors. In some examples, resistors 323 and 325 may have an impedance value of fifty ohms. In some examples, when RF load 322 is activated the RF signals in RF system port 306 may be prevented from being transmitted and received, and instead may be sent to ground (e.g., "terminated") through RF load 322. In some examples, when RF load 324 is activated the RF signals in RF system port 308 may be prevented from being transmitted and received, and instead may be sent to ground (e.g., "terminated") through RF load 324. For diversity reception, in some examples, both RF loads 322 and 324 may be deactivated. For complete isolation, in some examples, both RF loads 322 and 324 may be activated. In these examples, RF loads 322 and 324 may be an RF load and terminate the RF energy to ground when activated, and an open circuit when deactivated. In some examples, RF loads 322 and 324, possibly in conjunction with other components, may each be described herein as a "termination unit."

RF detect units 326 and 328 are circuits configured to detect whether RF signals are present on RF links 310 and 312. Although shown separate in FIG. 3 for purposes of example, it is contemplated that in some implementations RF detect unit 326 and RF detect unit 328 may be partially, or even highly, integrated. In some examples, RF detect units 326 and 328 may be described herein as "RF detection units."

RF processing unit 330 may be a circuit configured to control switchless port system 300. RF processing unit 330 may comprise any suitable arrangement of hardware, software, firmware, or any combination thereof, to perform the techniques attributed to the respective RF processing unit 330 herein. For example, RF processing unit 330 may include any one or more microprocessors, digital signal processors (DSPs), application specific integrated circuits (ASICs), field programmable gate arrays (FPGAs), programmable logic device (PLD), or any other equivalent integrated or discrete logic circuitry, as well as any combinations of such components.

In some examples, RF processing unit 330 may determine whether RF energy is being conducted in RF links 310 and 312 via RF detect units 326 and 328. In some examples, RF processing unit 330 may activate or deactivate RF loads 322 and 324 based on control input signal 344. In some examples, RF processing unit 330 may activate or deactivate RF loads 322 and 324 based on control input signal 344 and the determination that RF energy is being conducted in RF links 310 and 312. Diode 332 and 334 may be a circuit element between RF processing unit 330 and RF load 322 and 324. In some examples, diodes 332 and 334 provide current to RF load 322 and 324 when RF processing unit 330 activates RF load 322 and 324. In other examples, diodes 332 and 334 block current from RF load 324 and 322 to RF processing unit 330.

Links 336, 338, 340, and 342 (collectively "links 336-342") constitute any medium capable of conducting electrical signals from one location to another. Examples of links 336-342 include, but are not limited to, physical and/or wireless electrical transmission mediums such as electrical wires, electrical traces, twisted wire pairs, and the like. RF processing unit 330 may provide current to RF load 322 over link 336 to activate RF load 322, and may not provide current to RF load 322 over link 336 to deactivate RF load 322. RF processing unit 330 may send or receive signals from RF detect unit 326 over link 338, where the signals indicate whether there are RF signals on RF link 310. RF processing unit 330 may provide current to RF load 324 over link 340 to activate RF load 324, and may not provide current to RF load 324 over link 340 to deactivate RF load 324, RF processing unit 330 may send or receive signals from RF detect unit 328 over link 342, where the signals indicate whether there are RF signals on RF link 312.

Control input signal 344 is a signal, such as but not limited to, an electrical or optical signal that is used by RF processing unit 330 to determine whether to activate or deactivate RF loads 322 and 324. In some examples, control input signal 344 may be indicative of a transmission control selection of one RF system out of a plurality of RF systems. In other examples, control input signal 344 may be indicative of an isolation control selection of one or more RF systems out of a plurality of RF systems.

Status signal 346 is a signal, such as but not limited to, an electrical or optical signal that is used by RF processing unit 330 to provide information to an external system, such as but not limited to, a controller. In some examples, status signal 346 may have information indicative of whether RF loads 322 and 324 are active, or whether there is any RF energy in RF links 310 and 312.

RF detect link 348 and 350 are any medium capable of producing RF signals in response to being in proximity to other RF signals. In some examples, RF detect link 348 and 350 may each be a waveguide coupled to RF links 310 and 312, respectively. In other words, the RF energy may be coupled from RF links 310 and 312 to RF detect link 348 and 350. As RF signals are transmitted and received over RF links 310 and 312, a small amount of RF energy is diverted to RF detect link 348 and 350. The diverted RF energy may be detected by RF detect unit 326 and 328 and provided as an output signal to RF processing unit 330 over links 338 and 342. In the example of FIG. 3, RF detect link 348 and 350 are coupled between RF detect unit 326 and 328, and resistors 331 and 333, respectively, connected to ground to present an adequate RF load. In some examples, resistors 331 and 333 may have an impedance of fifty ohms at the frequency of interest, but resistors 331 and 333 may have any value depending on the RF system.

In the example of FIG. 3, RF system port 306 and 308 are operatively coupled to common RF port 304 by RF links 310 and 312 and microstrips 314-320. As both RF systems are connected in common with common RF port 304, both RF systems may transmit RF energy to and receive RF energy from common RF port 304. For example, a first RF system associated with RF system port 306 may transmit RF energy from RF system port 306 to RF link 310 with microstrip 314, which is connected to common RF port 304 by microstrip 320. In another example, the RF system associated with RF system port 308 may transmit RF energy from RF system port 308 to RF link 312 with microstrip 316, which is connected to common RF port 304 by microstrip 318. Conversely, both RF systems may also receive RF energy in the opposite manner. In certain circumstances, where the RF systems are substantially identical (e.g., redundant onboard weather radar systems), then the transmission of RF energy between each RF system is substantially identical (e.g., within 1 MHz). In some examples, both RF systems may operate with overlapping frequency bands. In some examples, to avoid operating both receivers of each RF system in the same frequency band, the non-transmitting RF system may be isolated by RF load 322 or RF load 324. In other circumstances, where the RF systems are radio based (e.g., communication processing systems), then the transmission of RF energy between each RF system may not substantially identical and a diplex filter may be included in the front end to keep the transmit energy out of the receiver. In some examples, system 300 may have one RF system transmit RF energy into a second RF system, as both RF systems are operatively coupled to common RF port 304. However, because each RF system may include a diplex filter and the transmission of RF energy between each RF system may not substantially identical, the receivers of either RF system may not require isolation by activation of either RF load 322 or RF load 324.

In one example implementation of system 300, with respect to FIG. 1, RF processing unit 330 may receive control input signal 344 (which corresponds to control input signal 144 as described in FIG. 1) from onboard weather radar system 150A indicating operation of onboard weather radar system 150B. After receiving control input signal 344, RF processing unit 330 may determine based on the output signal received front RF detect unit 326 over link 338 whether any RF transmission energy (e.g., "RF Tx energy") is present in RF link 310 and based on the output signal received from RF detect unit 328 over link 342 whether any RF Tx energy is present in RF link 312. Based on whether any RF Tx energy is present on link 310 or 312, RF processing unit 330 may activate or deactivate RF load 322 and/or activate or deactivate RF load 324.

For example, with respect to Table 1 below, under normal operation, RF processing unit 330 receives control input signal 344 indicating operation of onboard weather radar system 150B and determines that RF links 310 and 312 have no RF Tx energy, then RF processing unit 330 may deactivate RF loads 322 and 324. In other words, if there is no RF Tx energy, then RF processing unit 330 may allow all onboard weather radar systems that are powered on to receive reflected radar signals from an antenna. In other examples, when there is no RF Tx energy, then onboard weather radar systems 150 may be powered off. Additionally, under normal operation, when RF processing unit 330 determines that RF link 312 has RF Tx energy, then RF processing unit 330 may activate RF load 322, which may allow only onboard weather radar system 150B to transmit and receive RF energy aver RF link 312, while isolating onboard weather radar system 150A from the RF Tx energy over RF link 312. Under fault-protect mode, when RF processing unit 330 determines that RF link 310 has RF Tx energy, then RF processing unit 330 may activate RF load 322, which may allow onboard weather radar system 150B to be isolated from the RF Tx energy on RF link 310. Under normal-protect mode, when RF processing unit 330 determines that RF links 310 and 312 have RF Tx energy, then RF processing unit 330 may activate RF load 322, which may allow onboard weather radar system 150B to be isolated from the RF Tx energy on RF link 310.

Conversely, with respect to Table 1 below, under normal operation, RF processing unit 330 may receive control input signal 344 indicating operation of onboard weather radar system 150A and determines that RF links 310 and 312 have no RF Tx energy, then RF processing unit 330 may deactivate RF loads 322 and 324. In other words, if there is no RF Tx energy, then RF processing unit 330 may allow all onboard weather radar systems that are powered on to receive reflected radar signals from an antenna, such as weather radar antenna 160 as described in FIG. 1. In other examples, when there is no RF Tx energy, then onboard weather radar systems 150 may be powered off. Additionally, under normal operation, when RF processing unit 330 determines that RF link 310 has RF Tx energy, then RF processing unit 330 may activate RF load 324, which may allow onboard weather radar system 150A to transmit and receive RF energy aver RF link 310, while isolating onboard weather radar system 150B from the RF Tx energy over RF link 310. Under fault-protect mode, when RF processing unit 330 determines that RF link 312 has RF Tx enemy, then RF processing unit 330 may activate RF load 324, which may allow onboard weather radar system 150A to be isolated from the RF Tx energy on RF link 312. Under normal-protect mode, when RF processing unit 330 determines that RF links 310 and 312 have RF Tx energy, then RF processing unit 330 may activate RF load 324, which may allow onboard weather radar system 150A to be isolated from the RF Tx energy on RF link 312.

TABLE 1

RF Load Activation/Deactivation Combinations in FIGS. 1 & 3

| RF Link 310 | RF Link 312 | Control Input Signal 344 | Onboard Weather Radar System 150A | Onboard Weather Radar System 150B | Mode of Operation |
|---|---|---|---|---|---|
| No RF Tx Energy | No RF Tx Energy | Operate 150B | RF Load 322 Deactivated | RF Load 324 Deactivated | Normal- 150A & 150B Powered Off |
| No RF Tx Energy | RF Tx Energy | Operate 150B | RF Load 322 Activated | RF Load 324 Deactivated | Normal |
| RF Tx Energy | No RF Tx Energy | Operate 150B | RF Load 322 Activated | RF Load 324 Deactivated | Fault- Protect Mode |
| RF Tx Energy | RF Tx Energy | Operate 150B | RF Load 322 Activated | RF Load 324 Deactivated | Normal- Protect Mode |
| No RF Tx Energy | No RF Tx Energy | Operate 150A | RF Load 322 Deactivated | RF Load 324 Deactivated | Normal- 150A & 150B Powered Off |
| No RF Tx Energy | RF Tx Energy | Operate 150A | RF Load 322 Deactivated | RF Load 324 Activated | Fault- Protect Mode |
| RF Tx Energy | No RF Tx Energy | Operate 150A | RF Load 322 Deactivated | RF Load 324 Activated | Normal |
| RF Tx Energy | RF Tx Energy | Operate 150A | RF Load 322 Deactivated | RF Load 324 Activated | Normal- Protect Mode |

In another example implementation of system 300, with respect to FIG. 1, RF processing unit 330 may receive control input signal 344 (e.g., control input signal 144 from onboard weather radar system 150A as described in FIG. 1) indicating operation of onboard weather radar system 150B. After receiving control input signal 344, RF processing unit 330 may activate RF load 322 and deactivate RF load 324. In other words, RF processing unit 330 may allow only the transmitting radar system, onboard weather radar system 150B, to transmit radar signals and receive reflected radar signals (e.g., transmit a first RF signal and receive a second RF signal) from an antenna by activating RF load 322 and deactivating or maintaining deactivation of RF load 324.

Conversely, RF processing unit 330 may receive control input signal 344 indicating operation of onboard weather radar system 150A, RF processing unit 330 may deactivate RF load 322 and activate RF load 324. In other words, RF processing unit 330 may allow only the transmitting radar system, onboard weather radar system 150A, to transmit radar signals and receive reflected radar signals (e.g., transmit a third RF signal and receive a fourth RF signal) from an antenna, by activating RF load 324 and deactivating or maintaining deactivation of RF load 322.

In another example implementation of system 300, with respect to FIG. 2, RF processing unit 330 may receive control input signal 344 (e.g., control input signal 244 as described in FIG. 2) from flight information system 270 indicating operation of communications processing system 230B. After receiving control input signal 344, RF processing unit 330 may activate RF load 322 and deactivate RF load 324. In other words, RF processing unit 330 may allow only communications processing system 230B to transmit and receive communication RF signals (e.g., transmit a first RF signal and receive a second RF signal) from an antenna by activating RF load 322 and deactivating or maintaining deactivation of RF load 324.

Conversely, RF processing unit 330 may receive control input signal 344 indicating operation of communications processing system 230A, then RF processing unit 330 may deactivate RF load 322 and activate RF load 324. In other words, RF processing unit 330 may allow only communications processing system 230A to transmit and receive communication RF signals (e.g., transmit a third RF signal and receive a fourth RF signal) from an antenna by activating RF load 324 and deactivating or maintaining deactivation of RF load 322.

Figure 4:
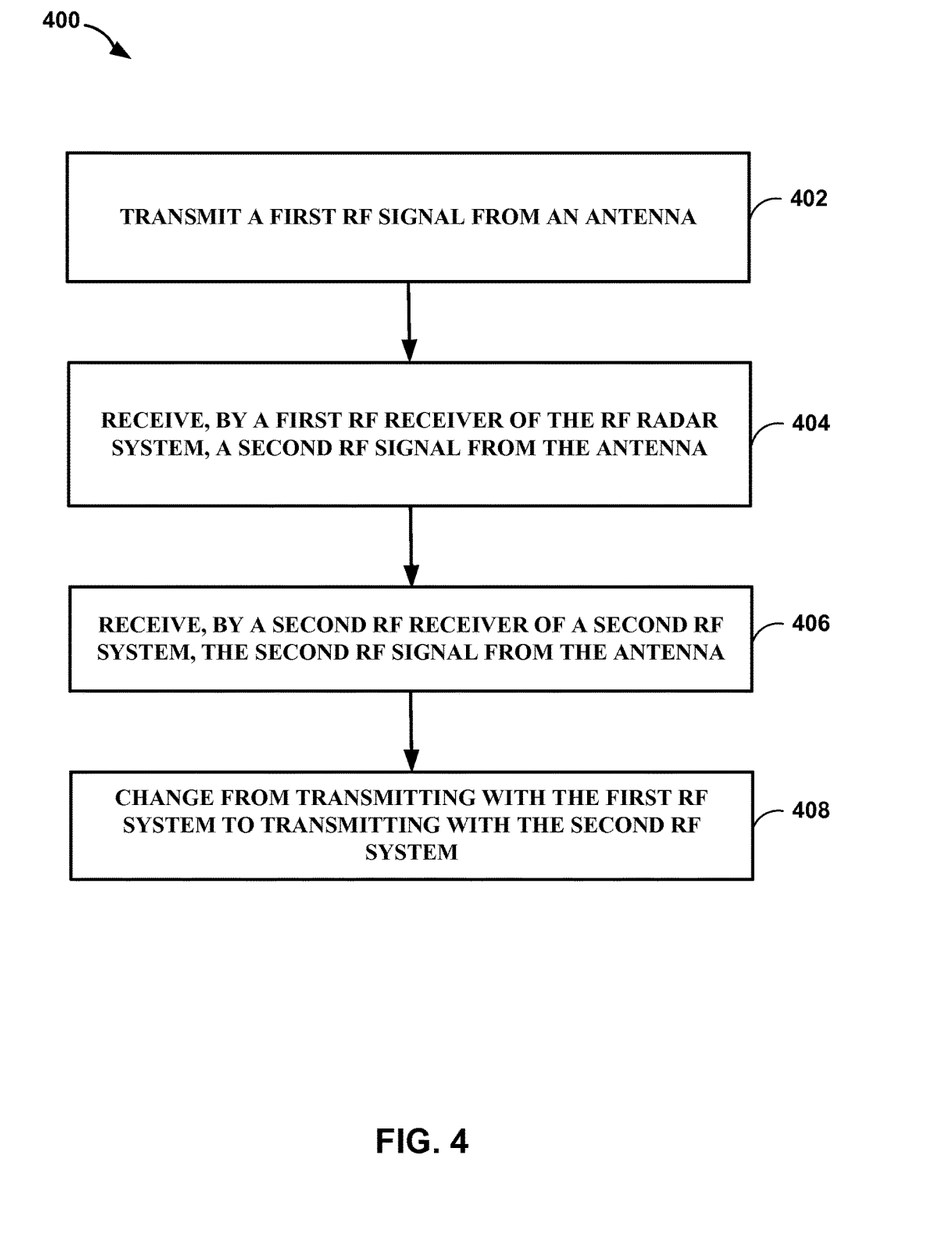
FIG. 4 is a flowchart illustrating an example process for operating two RF transmit and receive systems connected to a common RF port of an antenna without a physical RF switch.

FIG. 4 is a flowchart illustrating an example process 400 for operating two RF tx/rx systems connected to a common RF port of an antenna without a physical RF switch FIG. 4 is described within the context of FIGS. 1 and 3. In the example of FIG. 4, onboard weather radar system 150A may transmit a first RF signal from weather radar antenna 160 (402). In the example of FIG. 4, onboard weather radar system 150A may receive a second RF signal (e.g., a reflection of the transmitted first RF signal) front weather radar antenna 160 (404). In the example of FIG. 4, onboard weather radar system 150B may receive the second RF signal (e.g., a reflection of the transmitted first RF signal) from weather radar antenna 160, wherein RF port 106 and RF port 108 are both connected to common RF port 304 of weather radar antenna 160, and wherein onboard weather radar systems 150A and 150B operate with overlapping frequency bands (406). In the example of FIG. 4, flight aircraft 100 may change from transmitting with onboard weather radar system 150A to transmitting with onboard weather radar system 150B (408).

In some examples, process 400 may also include determining, by a first RF detection unit, whether the first RF port is being used, and responsive to determining that the first RF port is not being used, activating a first termination unit between the first RF system and the antenna, the activation of the first termination unit isolating the first RF system by conducting RF energy between the first RF system and the antenna to ground after being dissipated by the RF load resistor. In some examples, process 400 may also include determining, by a second RF detection unit, whether the second RF port is being used, and responsive to determining that the second RF port is not being used, activating a second termination unit between the second RF system and the antenna, the activation of the second termination unit isolating the second RF system by conducting RF energy between the second RF system and the antenna to ground after being dissipated by the RF load resistor.

In some examples, the first RF system and the second RF system of process 400 are redundant systems. In some examples, the first RF system and the second RF system of process 400 are connected to common RF port 304 of weather radar antenna 160 without a physical RF switch. In some examples, the first RF system and the second RF system of process 400 may be weather radar systems.

Figure 5:
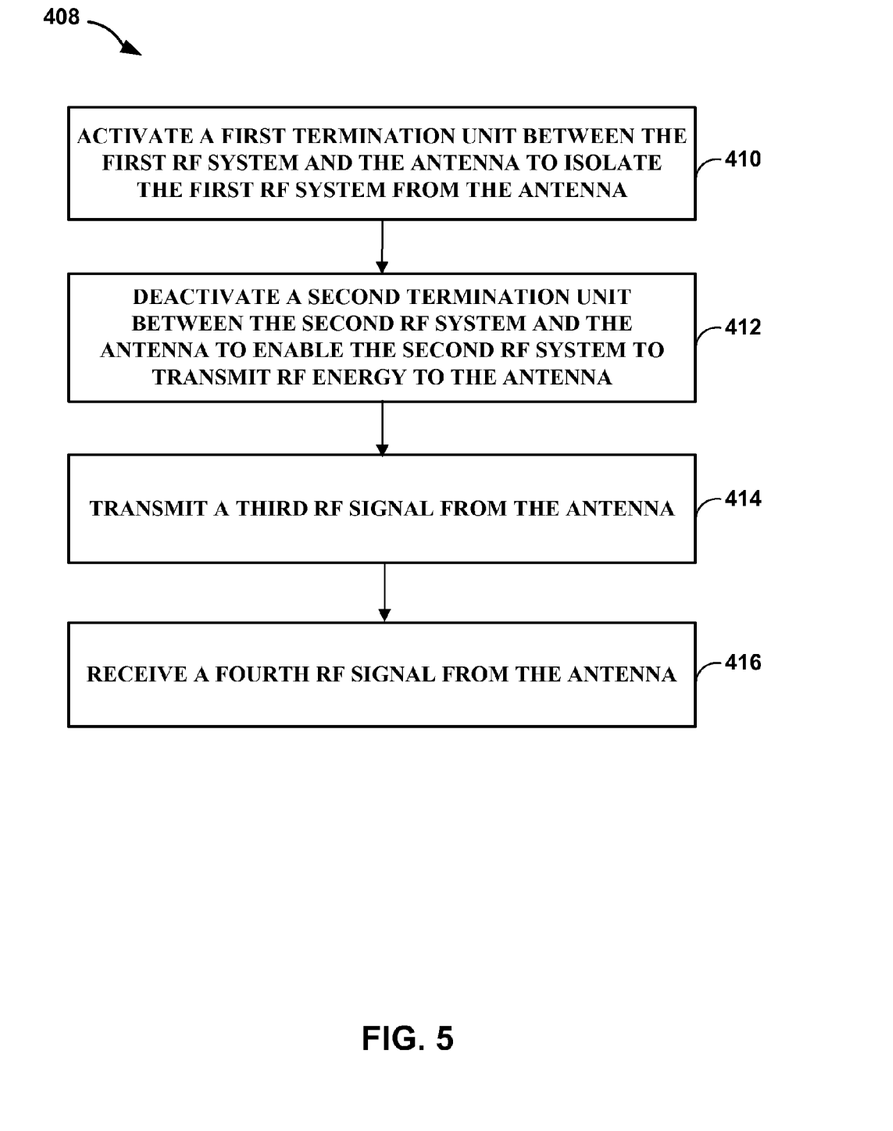
FIG. 5 is a flowchart illustrating an example process for changing from a first RF transmit and receive system to a second RF transmit and receive system connected to a common RF port of an antenna without a physical RF switch.

FIG. 5 is a flowchart illustrating an example process 408 for changing from a first RF tx/rx system to a second RF tx/rx system connected to a common RF port of an antenna without a physical RF switch. FIG. 5 is described within the context of FIGS. 1 and 3. In the example of FIG. 5, RF processing unit 330 may activate RF load 322 between onboard weather radar system 150A and weather radar antenna 160, wherein the activation of RF load 322 isolates onboard weather radar system 150A by conducting RF energy between onboard weather radar system 150A and weather radar antenna 160 to ground (410). In the example of FIG. 5, RF processing unit 330 tray deactivate RF load 324 between onboard weather radar system 150B and weather radar antenna 160, wherein the deactivating of RF load 324 enables onboard weather radar system 150B to conduct transmission RF energy to weather radar antenna 160 (412). In the example of FIG. 5, onboard weather radar system 150B may transmit a third RF signal (e.g., a transmitted radar signal) from weather radar antenna 160 (414). In the example of FIG. 5, onboard weather radar system 150B may receive a fourth RF signal (e.g., a reflection of the transmitted radar signal) from weather radar antenna 160 (416).

Figure 6:
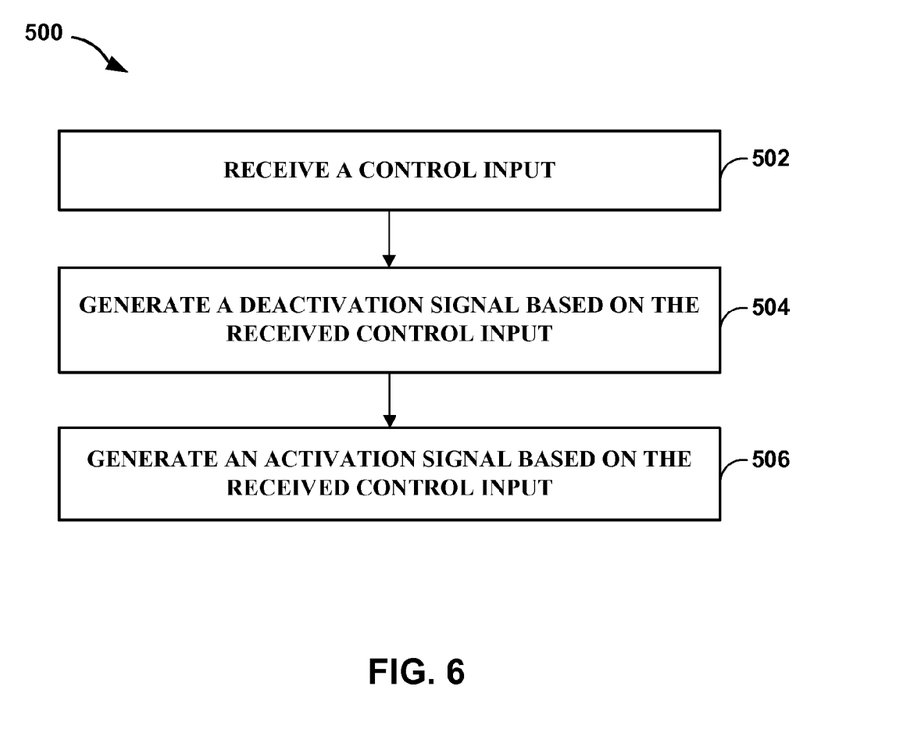
FIG. 6 is a flowchart illustrating an example process for operating an RF processing unit to control two RF transmit and receive systems connected to a common RF port of an antenna without a physical RF switch.

FIG. 6 is a flowchart illustrating an example process 500 for operating RF processing unit 330 to control two RF tx/rx systems connected to a common RF port of an antenna without a physical RF switch. FIG. 6 is described within the context of FIGS. 1 and 3.

In the example of FIG. 6, control input signal 344 may be indicative of a selection of onboard weather radar system 150A to transmit a first RF signal from weather radar antenna 160 (502). In the example of FIG. 6, RF processing unit 330 may generate, in response to receiving control input signal 344, a deactivation signal to RF load 322, wherein the deactivation signal to RF load 322 enables onboard weather radar system 150A to conduct transmission RF energy to weather radar antenna 160 (504). In the example of FIG. 6, RF processing unit 330 may generate, in response to receiving control input signal 344, an activation signal to RF load 324, wherein RF load 324 isolates onboard weather radar system 150A by conducting RF energy between onboard weather radar system 150B and the antenna to ground (506).

In some examples, process 500 may further include receiving a second control input, the second control input may be indicative of a selection of a second RF system of a plurality of RF systems to transmit a second RF signal from the antenna by a second RF transmitter. In some examples, process 500 may further include generating, in response to receiving the second control input, a deactivation signal to a second termination unit of the second RF system, wherein the deactivation signal to the second termination unit of the second RF system enables the second RF system to conduct transmission RF energy to the antenna. In some examples, process 500 may further include generating, in response to receiving the second control input, an activation signal to any other termination units except for the second termination unit, wherein the other termination units isolate the second RF system by conducting RF energy between the plurality of RF systems and the antenna to ground, except for the RF energy between the second RF system and the antenna.

In other examples, process 500 may further include receiving information from a first RF detection unit of a plurality of RF detection units whether a first RF port is being used, and activating, in response to determining that the first RF port is not being used, the first termination unit. In other examples, process 500 may further include deactivating, in response to determining that the first RF port is being used, the first termination unit.

In one or more examples, the functions described may be implemented in hardware, software, firmware, or any combination thereof. If implemented in software, the functions may be stored on or transmitted over, as one or more instructions of code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware units or software modules. Also, the techniques may be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various illustrative aspects of the disclosure are described above. These and other aspects are within the scope of the following claims.

What claimed is:

1. A method for changing between multiple radio frequency (RF) systems, the method comprising:
   transmitting, by a first radio frequency (RF) transmitter of a first RF system, a first RF signal to an antenna;
   receiving, by a first RF receiver of the first RF system, a second RF signal from the antenna; and
   receiving, by a second RF receiver of a second RF system, the second RF signal from the antenna, wherein:
      a first RF system port of the first RF system is connected to a common RF antenna port of the antenna with a first RF link,
      a second RF system port of the second RF system is connected to the common RF antenna port of the antenna with a second RF link,
      the first RF link comprises a first termination unit coupled to ground and the second RF link comprises a second termination unit coupled to ground, and
      an operating frequency of the first RF system overlaps with an operating frequency of the second RF system.

2. The method of claim 1, further comprising:
   changing from the first RF system to the second RF system, wherein the changing comprises:
      activating the first termination unit, wherein activating the first termination unit isolates the first RF system by conducting RF transmission energy between the first RF system and the antenna to ground;
      deactivating the second termination unit, wherein the deactivating the second termination unit enables the second RF system to conduct RF transmission energy to the antenna;
      transmitting, by a second RF transmitter of the second RF system, a third RF signal to the antenna; and
      receiving, by the second RF receiver of the second RF system, a fourth RF signal from the antenna.

3. The method of claim 1, further comprising:
   determining, by a first RF detection unit, whether the first RF system port is being used; and
   responsive to determining that the first RF system port is not being used, activating the first termination unit between the first RF system and the antenna, wherein activating the first termination unit isolates the first RF system by conducting RF transmission energy between the first RF system and the antenna to ground.

4. The method of claim 3, further comprising:
   determining, by a second RF detection unit, whether the second RF system port is being used;
   responsive to determining that the second RF system port is not being used, activating the second termination unit between the second RF system and the antenna, wherein activating the second termination unit isolates the second RF system by conducting RF transmission energy between the second RF system and the antenna to ground.

5. The method of claim 1, wherein the first RF system and the second RF system comprise redundant systems.

6. The method of claim 1, wherein the first RF system and the second RF system are connected to the common RF antenna port of the antenna without a physical RF switch.

7. The method of claim 1, wherein the first RF system and the second RF system comprise weather radar systems.

8. The method of claim 1, wherein the first RF system and the second RF system comprise communications processing systems.

9. The method of claim 1, wherein the common RF antenna port comprises a switchless port system.

10. The method of claim 1, wherein the first RF system and the second RF system comprise redundant weather radar systems.

11. A system comprising:
   a plurality of radio frequency (RF) systems, wherein each RF system of the plurality of RF systems comprises: a transmitter; a receiver; and an RF system port;
   an antenna;
   a common RF antenna port, wherein the common RF antenna port comprises a plurality of microstrips;
   a plurality of RF links, wherein each RF link of the plurality of RF links:
      couples a respective RF system port of the plurality of RF systems to a respective microstrip at the common RF antenna port, and
      couples to a respective termination unit, wherein the respective termination unit is (a) located on the RF link between the respective microstrip at the common RF port and the respective RF system port, and (b) the respective termination unit is coupled to a ground when activated; and
   wherein a first RF system of the plurality of RF systems is configured to transmit a first RF signal to the antenna by a first transmitter via a first RF link, and wherein the plurality of RF systems is configured to receive a second RF signal from the antenna via the plurality of RF links, and wherein an operating frequency of the first RF system overlaps with an operating frequency of the plurality of RF systems.

12. The system of claim 11, further comprising an RF processing unit, wherein the RF processing unit is operable to:
   configure the plurality of RF links to transmit a third RF signal to the antenna from a second RF system of the plurality of RF systems;
   isolate the first RF system, by activating a first termination unit, to conduct RF transmission energy from the first RF system to ground;

enable the second RF system, by deactivating a second termination unit, to conduct RF transmission energy from the second RF system to the antenna;

transmit, by a second RF transmitter of the second RF system, the third RF signal to the antenna; and receive, by the second RF receiver of the second RF system, a fourth RF signal from the antenna.

13. The system of claim 11, further comprising:

an RF processing unit;

a first RF detection unit, wherein the first RF detection unit is configured to determine whether a first RF port of the first RF system is being used; and responsive to determining that the first RF port is not being used, the RF processing unit is configured to isolate the first RF system by conducting RF transmission energy between the first RF system and the antenna to ground by activating a first termination unit.

14. The system of claim 13, further comprising:

a second RF detection unit, wherein the second RF detection unit is configured to determine whether a second RF port of a second RF system of the plurality of RF systems is being used; and responsive to determining that the second RF port is not being used, the RF processing unit is configured to isolate the second RF system by conducting RF transmission energy between the second RF system and the antenna to ground by activating a second termination unit.

15. The system of claim 11, wherein the plurality of RF systems is one of redundant RF systems or diversity receiver system.

16. The system of claim 11, wherein the plurality of RF systems is connected to the common RF port of the antenna without a physical RF switch.

17. The system of claim 16, wherein the plurality of RF systems is weather radar systems.

18. The system of claim 11, wherein each of the plurality of RF systems further comprise an RF system microstrip, and wherein the RF system microstrip:

is separate from the microstrip at the common RF antenna port, and enables each of the plurality of RF systems to operatively connect the respective RF system port of each of the plurality of RF systems to the respective RF link.

19. The system of claim 16, wherein the plurality of RF systems comprise communications processing systems.

20. The system of claim 16, wherein the common RF antenna port comprises a switchless port system.

* * * * *